May 10, 1966  F. WINKLER  3,250,586
FILM GATE
Filed May 1, 1963
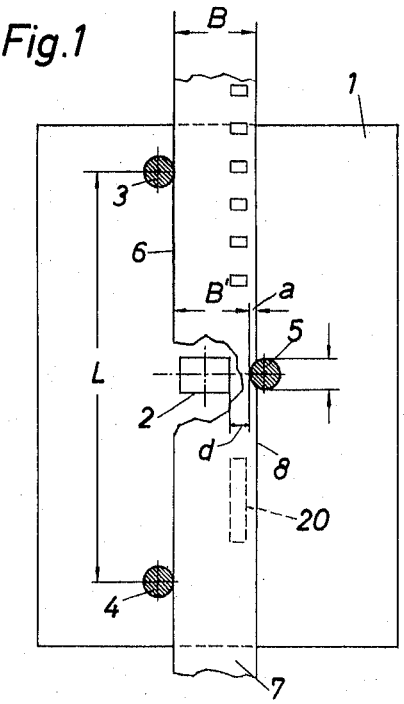
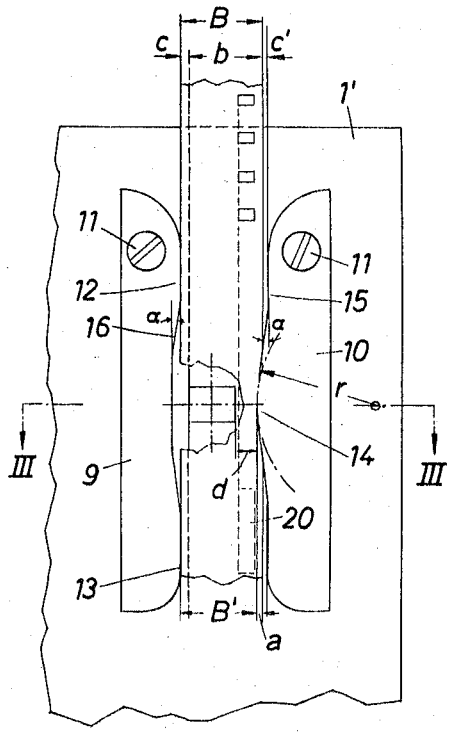
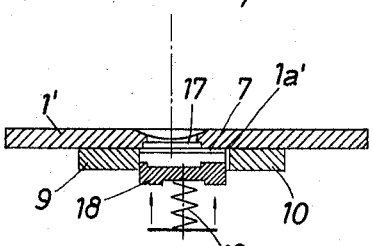
INVENTOR.
FRIEDRICH WINKLER
BY MICHAEL S. STRIKER
ATTORNEY

United States Patent Office 3,250,586
Patented May 10, 1966

3,250,586
FILM GATE
Friedrich Winkler, Munich, Germany, assignor to Agfa Aktiengesellschaft, Leverkusen, Germany
Filed May 1, 1963, Ser. No. 277,216
Claims priority, application Germany, May 5, 1962, A 40,144
12 Claims. (Cl. 352—224)

The present invention relates to photographic apparatus, and in particular to film gates for motion picture cameras or projectors.

Film gates of this type serve the function of guiding the film past the exposure aperture while properly positioning the film with respect to the aperture so that the successive frames will be properly positioned along the film strip.

Film gates of this type generally include a wall which is formed with the exposure aperture, and in order to guide the film with respect to the exposure aperture it is known to provide only three film-guiding elements. These elements are arranged, for example, in such a way that two of the film-guiding elements are located on one side of the aperture before and after the aperture in the direction of film movement while this pair of film guiding elements are rigidly fixed with the apertured wall so as to determine as accurately as possible the direction of movement and the position of one edge of the film strip which engages this pair of film-guiding elements. The opposite side of the film strip is engaged, in known structures, by a third film-guiding element which is aligned with the aperture and which is yieldable with respect to the apertured wall for example by being spring-pressed toward the aperture so as to resiliently press against the film and urge the opposite side edge thereof against the fixed film-guiding elements.

Inasmuch as the film itself is not rigid, but possesses its own inherent elasticity, the result is that there are in the region of the exposure aperture a pair of opposed resilient forces, the film strip itself resiliently opposing force of the spring-urged film-guiding element which is aligned with the aperture. The force with which the film strip itself opposes the force of the spring-urged film-guiding element is not at all constant, since this opposing force of the film itself will depend, among other factors, on the thickness and composition of the film material, on the moisture content of the film, and on the temperature at which the film happens to be, this latter factor being of considerable significance in projectors where the projection lamp of course provides a relatively high temperature. Moreover, it is extremely difficult to provide the spring-urged, intermediate film-guiding element with a spring force which accurately remains at a given, predetermined magnitude. The result is that the variations in the opposing spring forces provide corresponding variations in the lateral position of the film strip with respect to the exposure aperture, and of course these variations in the position of the film with respect to their aperture take place during movement of the film past the aperture.

It is known to guide the film between a pair of elongated parallel guides, but it is essential with such a construction to provide between such guides a distance which is at all times slightly greater than the width of the film so that the film will be prevented from becoming jammed between such film guides, and the same is true of those constructions which include four rigid film-guiding elements which are stationary with respect to the apertured wall since each pair of opposed film-guiding elements of such construction must also be spaced from each other by a distance which at all times is slightly greater than the width of the film. Because the distance between the film guiding elements of such structures must be greater htan the width of the film, it is also not possible with such structures to accurately position the film laterally with respect to the aperture. Even with structures which include a pair of spring-urged film-guiding elements engaging the same edge of the film, it is not possible to precisely determine the lateral position of the film with respect to the aperture.

It is accordingly a primary object of the present invention to provide for a film gate a structure which will very precisely position the film strip laterally with respect to the exposure aperture.

Another object of the present invention is to provide a structure which will accomplish this result while at the same time being exceedingly simple, and in fact simpler than conventional film-guiding structures.

A further object of the present invention is to provide a film gate with a film-guiding structure which can be adjusted so as to have a predetermined relationship with respect to the width of the film strip.

It is also an object of the present invention to provide a structure which takes advantage of the inherent elasticity of the film strip itself for accurately positioning the film strip with respect to the aperture.

Still another object of the present invention is to provide a film-guiding structure which can accomplish the above objects and which at the same time can be used for automatically threading the film through the film gate.

With these objects in view the invention includes, in a film gate, a wall formed with an exposure aperture, and a pair of stationary, rigid, film-guiding projections which are carried by this wall on one side of the aperture before and after the aperture in the direction of film movement, respectively. A third stationary, rigid film-guiding projection is carried by the wall on the opposite side of and in alignment with the aperture, and the arrangement is such that a straight line tangent to the pair of projections between the latter and the aperture is spaced from a parallel straight line tangent to the third projection between the latter and the aperture by a distance which is slightly less than the width of the film strip guided by the projections for movement past the aperture, so that one edge of the film strip will resiliently press against the third projection which thus accurately positions the portion of the film strip which in any instant extends across the aperture.

The novel features which are considered as characteristic for the invention are set forth in particular in the appended claims. The invention itself, however, both as to its construction and its method of operation together with additional objects and advantages thereof, will be best understood from the following description of specific embodiments when read in connection with the accompanying drawing, in which:

FIG. 1 is an illustration of one possible embodiment of this structure according to the present invention;

FIG. 2 shows another embodiment of a structure according to the present invention; and FIG. 3 is a transverse sectional view taken along line III—III of FIG. 2 in the direction of the arrows.

Referring to FIG. 1, there is shown therein a film gate structure which includes a wall 1 formed with the exposure aperture 2, the structure of FIG. 1 forming part of a motion picture camera or projector. A pair of stationary, rigid, film-guiding projections 3 and 4 are fixedly carried by the wall 1 on the left side of the aperture 2, as viewed in FIG. 1, before and after the aperture, respectively, in the direction of film movement, the film 7 moving downwardly, as view in FIG. 1, during operation of the apparatus. FIG. 1 shows the elongated opening 20 formed in the wall 1 and through which the conventional film-transporting claw extends to engage the perforations of the film in a manner well known in the art for advancing the film in a stepwise manner. The projections 3 and 4 are in the form of cylindrical pins and they are symmetrically positioned with respect to the aperture 2, the pins 3 and 4 being spaced from each other by the distance L indicated in FIG. 1.

The structure includes a third, stationary, rigid, film-guiding projection 5 which is carried by the wall 1 on the opposite side of the aperture 2 in alignment with the latter, and the projection 5 is also in the form of a cylindrical pin. The projection or cylindrical pin 5 is supported for eccentric turning movement by the wall 1. In other words the wall 1 is formed with an opening which receives a projection of reduced diameter of the pin 5, this latter projection being offset from the center of the pin 5 and this pin 5 is capable of being releasably fixed with the wall 1 by any suitable structure such as a threaded portion of the projection of reduced diameter located on the opposite side of the wall 1 from that shown in FIG. 1 and carrying a nut. Upon loosening of such a nut it is possible to turn the pin 5 and as a result of the eccentric mounting thereof on the wall 1 it is possible to adjust the distance between the pin 5 and the right edge of the opening 2, as viewed in FIG. 1. After adjustment of the position of the pin 5 it can be fixed in its adjusted position by tightening of such a nut or the like.

It will be noted that a straight line drawn tangent to the cylindrical pins 3 and 4 between the latter and the aperture 2 will fall at least approximately along the left edge of the film 7 while a straight line parallel to the line which is tangent to the projections 3 and 4 and tangent to the projection 5 between the latter and the aperture 2 will determine the distance B' shown in FIG. 1. This distance is the width of the passage or path for the film determined by the projections 3–5. In accordance with the present invention the distance B' is slightly less than the distance B which is equal to the width of the film strip 7. Thus, the film strip 7 is formed along one edge with perforations and width B of the film strip 7 is greater by the distance $a$ than the width B' of the passage or path along which the film is compelled to move by the film-guiding projections 3–5. For the sake of clarity of illustration the film 7 is shown in FIG. 1 in its flat, undeformed condition. For this reason the right edge portion of the film 7 in FIG. 1 appears to overlap the pin 5. Actually, this right edge of the film 7 will be displaced to the left, as viewed in FIG. 1, since its position is determined by the part of the projection 5 which is closest to the aperture 2. Thus, in order to place the edge 8 of the film 7 in engagement with the pin 5, this edge 8 must be displaced to the left, as viewed in FIG. 1, by the distance $a$, and this displacement will of course be guaranteed in the region of the aperture, and at least at this region the film will be slightly deformed and in cross section will have a very slight S-shaped configuration. The edge 8 of the film will thus be positioned at all times by the distance $d$ from the aperture 2, so that this distance $d$ remains constant. The magnitude of the distance $d$ is of course adjustable by adjustment of the pin 5, as described above.

The film 7 is derived, for example, from a 16 mm. film which is exposed in a camera first with one row of 8 mm. frames and then with a second row of 8 mm. frames, and then the film is split down its center so as to provide a single row of 8 mm. frames, and in the specific example of FIG. 1 there is shown a film gate structure of a projector in which the film 7 is located after development of the film and of course after splitting of the film to form the single row of 8 mm. transparencies or the like. The edge 8 which engages the pin 5 is preferably the outer, uncut edge of the film 7. In this way the cutting of the original film strip to form the two rows of 8 mm. frames will have no influence on the guiding of the film by the pin 5 inasmuch as the pin 5 will cooperate with the perforated edge of the film which is not influenced during the development and cutting of the original film strip. As a result lateral fluctuations in the position of the film during passage through the film gate are reliably excluded. Of course, the structure of FIG. 1 can be used in a camera, as pointed out above.

As was pointed out above, film strips such as the strip 7 conventionally have their own inherent elasticity, and by reason of the lateral compression of the film the film will press resiliently against the pin 5 which because of its location and alignment with the aperture 2 will at all times determine the lateral position of whichever portion of the film happens to extend across the aperture 2 at any instant. Thus, the possibility of resiliently engaging the film is derived from the resiliency of the film itself, and thus it becomes possible with this structure to allow for any slight variations in the film width by allowing the film itself to yield. The distance $a$ will range from 0.02 to 0.2 mm. depending upon the width of the film. In other words an extremely small film of relatively narrow width would be provided with a path whose width B' is on the order of 0.02 mm. smaller than the width B of the film, while a relatively wide film would be provided with a path whose width B' is on the order of 0.2 mm. smaller than the width B of the film. The distance L between the pair of projections 3 and 4 will range from 3 to 8 times the width of the film, here again depending on the width of the film. In this case a relatively narrow film would be used with a structure where the distance L is in the neighborhood of 8 times the width of the film, while a relatively wide film would be used with an arrangement where the distance L is on the order of 3 times the width of the film.

In the embodiment of the invention which is illustrated in FIGS. 2 and 3 the wall 1' carries a pair of rigid elongated members 9 and 10 which are adjustably fixed to the wall 1' by the screws 11. Thus, it is possible to loosen these screws and turn the elongated guide members 9 and 10 about the screws 11 until the position of the guide members 9 and 10 relative to each other and relative to the aperture of the wall 1' are adjusted, whereupon the screws 11 can be tightened for releasably fixing the rigid guide members 9 and 10 to the wall 1' in their adjusted positions. At its edge which is directed toward the exposure aperture, the member 9 is provided with a pair of projections 12 and 13 which correspond to the projections 3 and 4 of FIG. 1 and which engage the film to guide the latter. The elongated guide member 10 is provided beside the exposure aperture with a convex projection 14 corresponding to the projection 5.

Thus, it will be seen that the embodiment of FIG. 2 provides for the film the same general type of three-point guiding structure as is provided by the projections 3–5 of FIG. 1. For a film strip which carried 8 mm. frames the radius $r$ of curvature of the projection 14 is approximately 50 mm. The edge portions of the edges 15 and 16 of the members 10 and 9, respectively, which adjoin the projections 14, 12, and 13 make an angle on the order of 1.5° with the direction of movement of the film. Depending upon the width of the film strip and of course the tolerances with which this width is maintained, the distance $a$ by which the film is displaced to the left with the embodiment of FIG. 2 is from 0.05 to 0.2 mm. Thus, in the embodiment of FIG. 2 also the film will be compelled to press resiliently against the projection 14, and it is this projection which is located beside the aperture and which determines the lateral position of that portion of the film which at any instant extends across the exposure aperture.

As is apparent particularly from FIG. 3, the surface 1a' of the wall 1' which is engaged by the film is formed with an elongated groove 17 which extends along the film and which is of a width smaller than the total width of the film so that only that part of the film where the frames are located will be aligned with the groove 17 while the side edge portions of the film located laterally beyond the frames on both sides thereof will be the only parts of the film which will directly engage and slide along the surface 1a' of the wall 1'. A pressure plate 18 can be provided and urged in a known way by one or more springs 19 toward the wall 1', and also, in some cases, the pressure plate 18 can be swingably connected to the wall 1'. In order to prevent a side edge of the film from pressing into the groove 17, the distance c (FIG. 2) between the left edge of the groove 17 and the projections 12 and 13 is greater than the distance c' between the right edge of the film and the straight portion of the edge 15 of the elongated guide member 10.

The structure which is illustrated in FIGS. 2 and 3 lends itself particularly to automatic threading of the film. The forces which act on the film to position it between the three projections 12–14 are extremely small, so that without any further devices or precautions it is possible for the films simply to be fed directly from the supply spool through the film guiding structure shown in FIGS. 2 and 3. The turning of the supply spool will act reliably to push the film automatically through the film gate structure shown in FIGS. 2 and 3. The opening 20 for the film-advancing claw is situated in the direction of the movement of the film just after the projection 14 and just before the projection 13, between these projections 13 and 14. Therefore, if the claw operates during threading of the film it is possible for the claw to engage the film before the film has been deformed by running along the projection 13, and thus the claw itself can be relied upon to augment the reliability with which the film is threaded through the path determined by the three projections 12–14.

As was indicated above, for an 8 mm. film strip the radius of curvature of the projection 14 will be on the order of 50 mm., and in general this radius of curvature will range from four to eight times the width of the film. Also, while the angle of the edge portions 15 and 16 which adjoin the projections 12–14 have been indicated as being inclined on the order of 1.5° with respect to the direction of film movement, this angle will in general be less than 5° and will preferably lie somewhere between 1 and 2°.

Although the invention has been described above and shown in the drawing in connection with relatively narrow film, and in particular 8 mm. film, it is to be understood that the invention is equally applicable to all other types of film guiding structures. It should be noted also that with the structure of the invention it is unnecessary to provide any spring-urged elements which are required to extend through a cutout in the film-guiding structure in order to engage the film and also the disadvantage of such structures with respect to their undesirable influence on the passage of the film, as when a spliced portion of the film engages such a spring-pressed structure, are reliably avoided with the structure of the invention. The structure of the invention requires only guide elements of an extremely simple construction, and in particular with the embodiment of FIG. 1 it is possible to produce the desired results with only three simple pins which are attached to the plate 1.

It will be understood that each of the elements described above or two or more together, may also find a useful application in other types of cameras differing from the types described above.

While the invention has been illustrated and described as embodied in film gates, it is not intended to be limited to the details shown, since various modifications and structural changes may be made without departing in any way from the spirit of the present invention.

Without further analysis the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed and desired to be secured by Letters Patent is:

1. In a film gate, in combination, a wall having a surface along which film moves in a predetermined path and said wall being formed along said path with an exposure aperture; a pair of stationary, rigid, guiding projections carried by said wall on one side of said aperture before and after said aperture, respectively, in the direction of film movement; and a third stationary, rigid, guiding projection carried by said wall on the opposite side of and in alignment with said aperture, a straight line tangent to said pair of projections between the latter and said aperture being spaced from a parallel straight line tangent to said third projection between the latter and said aperture by a distance which is slightly less than the width of a film strip guided by said projections for movement past said aperture, and said film path being in the region of said pair of projections, but on said other side of said aperture entirely unobstructed beyond said parallel straight line tangent to said third projection so that the latter is the nearest film guiding element on said other side of said aperture within the entire region of said projections whereby one edge of the film strip will resiliently press against said third projection which thus accurately positions the portion of the film strip which at any instant extends across said aperture.

2. In a film gate, in combination, a wall having a surface along which film moves in a predetermined path and said wall being formed along said path with an exposure aperture; a pair of stationary, rigid film guiding projections carried by said wall on one side of said aperture before and after said aperture, respectively, in the direction of film movement; and a third stationary, rigid film guiding projection carried by said wall on the opposite side of and in alignment with said aperture, a straight line tangent to said pair of projections between the latter and said aperture being spaced from a parallel straight line tangent to said third projection between the latter and said aperture by a distance which is from 0.02 to 0.2 mm. less than the width of a film strip guided by said projections for movement past said aperture, and said film path being in the region of said pair of projections, but on said other side of said aperture entirely unobstructed beyond said parallel straight line tangent to said third projection so that the latter is the nearest film guiding element on said other side of said aperture within the entire region of said projections whereby one edge of the film strip will resiliently press against said third projection which thus accurately positions the portion of the film strip which at any instant extends across said aperture.

3. In a film gate, in combination, a wall having a surface along which film moves in a predetermined path and said wall being formed along said path with an exposure aperture; a pair of stationary, rigid, guiding projections carried by said wall on one side of said aperture before and after said aperture, respectively, in the direction of film movement, said pair of film guiding projections being symmetrically positioned with respect to said aperture and the distance between said pair of projections being from 3 to 8 times greater than the width of a film strip which moves past said aperture; and a third stationary, rigid, guiding projection carried by said wall on the opposite side of and in alignment with said aperture, a straight line tangent to said pair of projections between the latter and said aperture being spaced from a parallel straight line tangent to said third projection between the latter and said aperture by a distance which is slightly less than the width of a film strip guided by said projections for movement past said aperture, and said film path being in the region of said pair of projections, but on said other side of said aperture entirely unobstructed beyond said parallel straight line tangent to said third projection so that the latter is the nearest film guiding element on said other side of said aperture within the entire region of said projections whereby one edge of the film strip will resiliently press against said third projection which thus accurately positions the portion of the film strip which at any instant extends across said aperture.

4. In a film gate, in combination, a wall having a surface along which film moves in a predetermined path and said wall being formed along said path with an exposure aperture; a pair of stationary, rigid, film-guiding, cylindrical pins carried by said wall on one side of said aperture before and after said aperture, respectively, in the direction of film movement; and a third stationary, rigid, film-guiding, cylindrical pin carried by said wall on the opposite side of and in alignment with said aperture, a straight line tangent to said pair of pins between the latter and said aperture being spaced from a parallel straight line tangent to said third pin between the latter and said aperture by a distance which is slightly less than the width of the film strip guided by said pins for movement past said aperture, and said film path being in the region of said pair of pins, but on said other side of said aperture entirely unobstructed beyond said parallel straight line tangent to said third pin so that the latter is the nearest film guiding element on said other side of said aperture within the entire region of said pin whereby that one edge of the film strip will resiliently press against said third pin which thus accurately positions the portion of the film strip which at any instant extends across said aperture.

5. In a film gate, in combination, a wall formed with an exposure aperture; and a pair of stationary rigid elongated film-guiding members carried by said wall respectively on opposite sides of said aperture and defining between themselves a passage along which a film strip is adapted to move past said aperture, one of said members having at its edge which is adjacent said aperture a pair of film-engaging projections respectively located before and after said aperture in the direction of film movement and the other of said film-guiding members having at its edge which is adjacent said aperture a projection aligned with said aperture and adapted to engage the edge of the film strip opposed to that which is engaged by the pair of projections of said one member, the distance between a straight line tangent to said pair of projections of said one member and a parallel straight line tangent to the projection of said other member being slightly less than the width of a film strip guided between said members past said aperture, said film passage being, in the region of said pair of projections, entirely unobstructed on said other side of said aperture beyond said parallel straight line tangent to said projection of said other member, so that the latter is the nearest film guiding element on said other side of said aperture within the entire region of said projections.

6. In a film gate, in combination, a wall formed with an exposure aperture; and a pair of stationary rigid elongated film-guiding members carried by said wall respectively on opposite sides of said aperture and defining between themselves a passage along which a film strip is adapted to move past said aperture, one of said members having at its edge which is adjacent said aperture a pair of film-engaging projections respectively located before and after said aperture in the direction of film movement and the other of said film-guiding members having at its edge which is adjacent said aperture a projection aligned with said aperture and adapted to engage the edge of the film strip opposed to that which is engaged by the pair of projections of said one member, the distance between a straight line tangent to said pair of projections of said one member and a parallel straight line tangent to the projection of said other member being slightly less than the width of a film strip guided between said members past said aperture, said projection of said other film-guiding member being convexly curved and having a radius of curvature which is from 4 to 8 times greater than the width of the film strip, said film passage being, in the region of said pair of projections, entirely unobstructed on said other side of said aperture beyond said parallel straight line tangent to said projection of said other member, so that the latter is the nearest film guiding element on said other side of said aperture within the entire region of said projections.

7. In a film gate, in combination, a wall formed with an exposure aperture; and a pair of stationary rigid elongated film-guiding members carried by said wall respectively on opposite sides of said aperture and defining between themselves a passage along which a film strip is adapted to move past said aperture, one of said members having at its edge which is adjacent said aperture a pair of film-engaging projections respectively located before and after said aperture in the direction of film movement and the other of said film-guiding members having at its edge which is adjacent said aperture a projection aligned with said aperture and adapted to engage the edge of the film strip opposed to that which is engaged by the pair of projections of said one member, the distance between a straight line tangent to said pair of projections of said one member and a parallel straight line tangent to the projection of said other member being slightly less than the width of a film strip guided between said members past said apertures, and the edge portions of said members which are adjacent to said projections being inclined with respect to the direction of movement of the film by an angle of less than 5°, said film passage being, in the region of said pair of projections, entirely unobstructed on said other side of said aperture beyond said parallel straight line tangent to said projection of said other member, so that the latter is the nearest film guiding element on said other side of said aperture within the entire region of said projections.

8. In a film gate, in combination, a wall formed with an exposure aperture; and a pair of stationary rigid elongated film-guiding members carried by said wall respectively on opposite sides of said aperture and defining between themselves a passage along which a film strip is adapted to move past said aperture, one of said members having at its edge which is adjacent said aperture a pair of film-engaging projections respectively located before and after said aperture in the direction of film movement and the other of said film-guiding members having at its edge which is adjacent said aperture a projection aligned with said aperture and adapted to engage the edge of the film strip opposed to that which is engaged by the pair of projections of said one member, the distance between a straight line tangent to said pair of projections of said one member and a parallel straight line tangent to the projection of said other member being slightly less than the width of a film strip guided between said members past said aperture, and the edge portions of said film-guiding members which are adjacent said projections thereof being inclined with respect to the direction of movement of the film strip by an angle of from 1 to 2°, said film passage being, in the region of said pair of projections, entirely unobstructed on said other side of said aperture beyond said parallel straight line tangent to said projection of said other member, so that the latter is the nearest film guiding element on said other side of said aperture within the entire region of said projections.

9. In a film gate, in combination, a wall formed with an exposure aperture; and a pair of stationary rigid elongated film-guiding members carried by said wall respectively on opposite sides of said aperture and defining between themselves a passage along which a film strip is adapted to move past said aperture, one of said members having at its edge which is adjacent said aperture a pair of film-engaging projections respectively located before and after said aperture in the direction of film movement and the other of said film-guiding members having at its edge which is adjacent said aperture a rigid projection aligned with said aperture and adapted to engage the edge of the film strip opposed to that which is engaged by the pair of projections of said one member, the distance between a straight line tangent to said pair of projections of said one member and a parallel straight line tangent to the projection of said other member being slightly less than the width of a film strip guided between said members past said aperture, at least one of said members being turnably connected to said wall for adjusting the distance between said lines and, said film passage being, in the region of said pair of projections, entirely unobstructed on said other side of said aperture beyond said parallel straight line tangent to said projection of said other member, so that the latter is the nearest film guiding element on said other side of said aperture within the entire region of projections.

10. In a film gate, in combination, a wall formed with an exposure aperture; and a pair of stationary rigid elongated film-guiding members carried by said wall respectively on opposite sides of said aperture and defining between themselves a passage along which a film strip is adapted to move past said aperture, one of said members having at its edge which is adjacent said aperture a pair of film-engaging projections respectively located before and after said aperture in the direction of film movement and the other of said film-guiding members having at its edge which is adjacent said aperture a projection aligned with said aperture and adapted to engage the edge of the film strip opposed to that which is engaged by the pair of projections of said one member, the distance between a straight line tangent to said pair of projections of said one member and a parallel straight line tangent to the projection of said other member being slightly less than the width of a film strip guided between said members past said aperture, and said wall being formed with a claw opening located subsequent to said projection of said other member in the direction of film movement but in advance of the projection of said one member which is located after said aperture in the direction of film movement, said film passage being, in the region of said pair of projections, entirely unobstructed on said other side of said aperture beyond said parallel straight line tangent to said projection of said other member, so that the latter is the nearest film guiding element on said other side of said aperture within the entire region of said projections.

11. In a film gate, in combination, a wall formed with an exposure aperture; a pair of stationary, rigid, film-guiding, cylindrical pins carried by said wall on one side of said aperture before and after said aperture, respectively, in the direction of film movement; and a third stationary, rigid, film-guiding, cylindrical pin carried by said wall on the opposite side of and in alignment with said aperture, a straight line tangent to said pair of pins between the latter and said aperture being spaced from a parallel straight line tangent to said third pin between the latter and said aperture by a distance which is slightly less than the width of the film strip guided by said pins for movement past said aperture, so that the edge of the film strip will resiliently press against said third pin which thus accurately positions the portion of the film strip which at any instant extends across said aperture, at least one of said pins being eccentrically supported for turning movement relative to said wall for adjusting the distance between said parallel straight lines.

12. In a film gate, in combination, a wall formed with an exposure aperture; a pair of stationary, rigid, film-guiding, cylindrical pins carried by said wall on one side of said aperture before and after said aperture, respectively, in the direction of film movement; and a third stationary, rigid, film-guiding, cylindrical pin carried by said wall on the opposite side of and in alignment with said aperture, a straight line tangent to said pair of pins between the latter and said aperture being spaced from a parallel straight line tangent to said third pin between the latter and said aperture by a distance which is slightly less than the width of the film strip guided by said pins for movement past said aperture, so that one edge of the film strip will resiliently press against said third pin which thus accurately positions the portion of the film strip which at any instant extends across said aperture, said third pin being supported for eccentric turning movement by said wall for adjusting the distance between said lines.

References Cited by the Examiner

UNITED STATES PATENTS 2,232,811   2/1941   Sperry _____ 352—224 X

FOREIGN PATENTS 675,296   7/1952   Great Britain.

JULIA E. COINER, *Primary Examiner.*